US006483507B2

(12) United States Patent
Osborne et al.

(10) Patent No.: US 6,483,507 B2
(45) Date of Patent: Nov. 19, 2002

(54) SUPER-SAMPLING AND GRADIENT ESTIMATION IN A RAY-CASTING VOLUME RENDERING SYSTEM (75) Inventors: Randy B. Osborne, Beaverton, OR (US); Ingmar Bitter, Stony Brook, NY (US); Hanspeter Pfister, Somerville, MA (US); James Knittel, Groton, MA (US); Hugh C. Lauer, Concord, MA (US)

(73) Assignee: TeraRecon, Inc., San Mateo, CA (US)

( * ) Notice: Subject to any disclaimer, the term of this patent is extended or adjusted under 35 U.S.C. 154(b) by 0 days.

(21) Appl. No.: 09/862,901

(22) Filed: May 22, 2001

(65) Prior Publication Data
US 2002/0005850 A1 Jan. 17, 2002

Related U.S. Application Data (63) Continuation of application No. 09/190,712, filed on Nov. 12, 1998, now abandoned.

(51) Int. Cl.[7] .............................................. G06T 15/00
(52) U.S. Cl. ........................ 345/419; 345/422; 345/424
(58) Field of Search ................................ 345/419, 422, 345/424

(56) References Cited

U.S. PATENT DOCUMENTS 5,847,711 A * 12/1998 Kaufman et al. ........... 345/424
6,008,813 A * 12/1999 Lauer et al. ................ 345/418
6,285,348 B1 * 9/2001 Lewis ........................ 345/422

* cited by examiner

Primary Examiner—Mark Zimmerman
Assistant Examiner—Eugene L Santiago
(74) Attorney, Agent, or Firm—Dirk Brinkman (57) ABSTRACT A volume rendering processor renders a two-dimensional image from a volume data set of voxels constituting a three-dimensional representation of an object. Voxel memory interface logic retrieves the voxels from a voxel memory in a scanned order with respect to X, Y and Z coordinate axes, the Z axis being the axis most nearly parallel to a predefined viewing direction. The set of voxels having equal Z coordinate values are referred to as a "slice" of voxels. Interpolation logic calculates a sequence of samples from the retrieved voxels such that (i) each sample lies along a corresponding imaginary ray extending through the object parallel to the viewing direction, (ii) each sample results from interpolating the eight voxels surrounding the sample in the XYZ coordinate system. "Supersampling" in the Z dimension is performed such that the number of samples calculated for each ray is greater than the number of slices of voxels in the volume data set. Gradient calculation logic calculates for each sample respective gradients in the X, Y and Z directions for use by classification and illumination logic. The X and Y gradients are calculated from the samples emitted by the interpolation logic, and Z gradients are calculated by (i) calculating Z gradients at the voxel positions from voxel values retrieved from memory, and (ii) interpolating the voxel Z gradients to arrive at the Z gradients at the sample positions.

17 Claims, 9 Drawing Sheets

SUPER-SAMPLING AND GRADIENT ESTIMATION IN A RAY-CASTING VOLUME RENDERING SYSTEM

CROSS REFERENCE TO RELATED APPLICATIONS

This application is a continuation of application Ser. No. 09/190,712 filed on Nov. 12, 1998, now abandoned.

BACKGROUND OF THE INVENTION

The present invention is related to the field of computer graphics, and in particular to volume graphics.

Volume graphics is the subfield of computer graphics that deals with the visualization of objects or phenomena represented as sampled data in three or more dimensions. These samples are called volume elements, or "voxels," and contain digital information representing physical characteristics of the objects or phenomena being studied. For example, voxel values for a particular object or system may represent density, type of material, temperature, velocity, or some other property at discrete points in space throughout the interior and in the vicinity of that object or system.

Volume rendering is the part of volume graphics concerned with the projection of volume data as two-dimensional images for purposes of printing, display on computer terminals, and other forms of visualization. By assigning colors and transparency to particular voxel data values, different views of the exterior and interior of an object or system can be displayed. For example, a surgeon needing to examine the ligaments, tendons, and bones of a human knee in preparation for surgery can utilize a tomographic scan of the knee and cause voxel data values corresponding to blood, skin, and muscle to appear to be completely transparent. The resulting image then reveals the condition of the ligaments, tendons, bones, etc. which are hidden from view prior to surgery, thereby allowing for better surgical planning, shorter surgical operations, less surgical exploration and faster recoveries. In another example, a mechanic using a tomographic scan of a turbine blade or welded joint in a jet engine can cause voxel data values representing solid metal to appear to be transparent while causing those representing air to be opaque. This allows the viewing of internal flaws in the metal that would otherwise be hidden from the human eye.

Real-time volume rendering is the projection and display of volume data as a series of images in rapid succession, typically at 30 frames per second or faster. This makes it possible to create the appearance of moving pictures of the object, phenomenon, or system of interest. It also enables a human operator to interactively control the parameters of the projection and to manipulate the image, while providing to the user immediate visual feedback. It will be appreciated that projecting tens of millions or hundreds of millions of voxel values to an image requires enormous amounts of computing power. Doing so in real time requires substantially more computational power.

Further background on volume rendering is included in a Doctoral Dissertation entitled "Architectures for Real-Time Volume Rendering" submitted by Hanspeter Pfister to the Department of Computer Science at the State University of New York at Stony Brook in December 1996, and in U.S. Pat. No. 5,594,842, "Apparatus and Method for Real-time Volume Visualization." Additional background on volume rendering is presented in a book entitled "Introduction to Volume Rendering" by Barthold Lichtenbelt, Randy Crane, and Shaz Naqvi, published in 1998 by Prentice Hall PTR of Upper Saddle River, N.J.

The reconstruction of images from sampled data is the domain of a branch of mathematics known as "sampling theory". From the well-known Nyquist sampling theorem, the frequency at which data must be sampled must equal or exceed twice the spatial frequency of the data in order to obtain faithful reconstruction of the information in the data. This constraint is true in multiple dimensions as well as in one dimension.

Volume data sets are typically organized as samples along regular grids in three dimensions, which defines the spatial frequency inherent in the data. In order to project three-dimensional volume data onto a two-dimensional image plane by ray-casting, the data must be re-sampled at a sampling frequency equal to or greater than the Nyquist frequency. If the sampling frequency is not sufficiently high, undesirable visual artifacts caused by aliasing appear in the rendered image, especially moving images such as images being manipulated by a human viewer in real-time. Thus one of the challenges in real-time volume rendering is the efficient re-sampling of volume data in support of high-quality rendering from an arbitrary and changing view direction.

Another aspect of volume rendering is the application of artificial "illumination" or "lighting" to the rendered image, which is the creation of highlights and shadows that are essential to a realistic two-dimensional representation of a three-dimensional object. Lighting techniques are well-known in the computer graphics art and are described, for example, in the textbook "Computer Graphics: Principles and Practice," 2nd edition, by J. Foley, A. vanDam, S. Feiner, and J. Hughes, published by Addison-Wesley of Reading, Mass., in 1990.

One illumination technique that generates very high quality images is known as "Phong illumination" or "Phong shading". The Phong illumination algorithm requires knowledge of the orientation of surfaces appearing in the rendered image. Surface orientation is indicated by a vector referred to as a "normal". In volume rendering, one way to obtain the normal is to estimate gradients for the samples of the volume data. Various techniques can be used to calculate gradients. According to one commonly-used technique, the gradients are estimated by calculating "central differences". That is, the gradient in a given direction at a sample point is equal to the difference between the values of the two sample points surrounding the sample in the indicated direction.

The performance of illumination algorithms in general is very sensitive to the accuracy of the gradient calculation. To obtain the best-quality rendered image, it is important that gradients be calculated very accurately.

In a ray-casting system in which sample planes are normal to the rays, it is fairly straightforward to calculate gradients from samples of the volume data using central differences. There are, however, systems in which sample planes are parallel to the planes of voxels, so that the angle between sample planes and rays is dependent on view angle. One example of such a system is shown in the aforementioned Doctoral Dissertation. In these systems, the calculation of gradients is substantially more difficult, because the weight to be given neighboring samples is dependent on the viewing angle.

One prior technique for calculating gradient values has been to calculate an intermediate value using unity weights, and then to apply a correction factor that is a function of viewing angle. Unfortunately, this technique is both complicated and inaccurate. It would be desirable to improve the performance of illumination algorithms such as Phong illumination by enabling the calculation of accurate gradients in a manner that lends itself to efficient hardware implementation in a volume rendering processor.

BRIEF SUMMARY OF THE INVENTION

In accordance with the present invention, a ray-casting volume rendering processor is disclosed which in which volume data is efficiently re-sampled as an image is rendering from an arbitrary and changing view direction. Accurate gradients are calculated for use in a Phong illumination algorithm, and high rendering throughput is maintained while the appearance of sampling-induced artifacts in the rendered image is minimized.

The disclosed volume rendering processor includes voxel memory interface logic operative to continually retrieve the voxels from a voxel memory in which a volume data set is stored. The voxel memory is scanned in order with respect to a Cartesian coordinate system having mutually perpendicular X, Y and Z coordinate axes, the Z axis being the axis more nearly parallel to a predefined viewing direction than either the X or Y axes. Interpolation logic coupled to the voxel memory interface logic continually receives the retrieved voxels and calculates samples such that (i) each sample lies along a corresponding imaginary ray extending through the object parallel to the viewing direction, (ii) each sample is the result of interpolation among a surrounding set of voxels in the Cartesian coordinate system, and (iii) the spatial frequency of the samples in one or more or the X, Y and Z directions is greater than the spatial frequency of the voxels in the same direction. This "supersampling" greatly reduces the presence of visual artifacts in the rendered image.

In another disclosed technique, X and Y components of gradients are calculated from samples emitted by the interpolation logic, and Z gradients are calculated by (i) calculating Z gradients at the voxel positions from voxel values retrieved from memory, and (ii) interpolating the voxel Z gradients to arrive at the Z gradients at the sample positions. The calculation of Z-gradients from the voxels rather than from samples greatly simplifies the calculation of the Z gradients while attaining greater accuracy over prior approaches.

In yet another disclosed technique, the interpolation logic generates (i) a first set of intermediate interpolation values by interpolating between adjacent voxels in a first dimension, and (ii) a second set of intermediate interpolation values resulting by interpolating between the first intermediate interpolation values in a second dimension, and the samples representing the re-sampling of the retrieved voxels are calculated by interpolating between the second intermediate interpolation values in the third dimension. The intermediate interpolation values are used to calculate multiple adjacent samples, so that high throughput in the interpolation stages is maintained.

Other aspects, features, and advantages of the present invention are disclosed in the detailed description which follows.

BRIEF DESCRIPTION OF THE SEVERAL VIEWS OF THE DRAWING

The foregoing features of this invention, as well as the invention itself, may be more fully understood from the following Detailed Description of the Invention, and Drawing, of which.

DETAILED DESCRIPTION OF THE INVENTION

Figure 1:
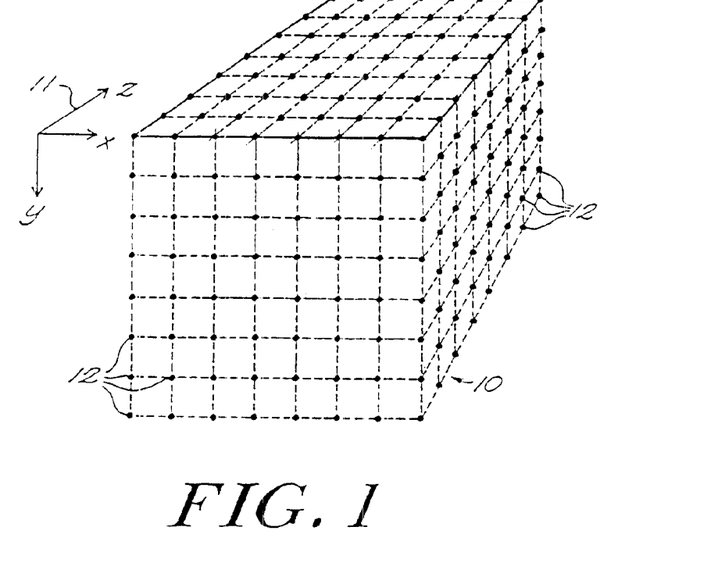
FIG. 1 is a diagrammatic illustration of a volume data set.

Referring now to FIG. 1 and by way of further background, a view of a three-dimensional volume data set 10 is shown. FIG. 1 depicts an array of voxel positions 12 arranged in the form of a rectangular solid. More particularly, the voxel positions fill the solid in three dimensions and are uniformly spaced. The position of each voxel can be represented in a coordinate system defined by the three axes 11 labeled X, Y, and Z. Associated with each voxel position is one or more data values representing some characteristics of the object, system, or phenomenon under study, for example density, type of material, temperature, velocity, opacity or other properties at discrete points in space throughout the interior and in the vicinity of that object or system. It is convenient to represent a volume data set in a computer as a three-dimensional array of values, with the value at array index position (X, Y, Z) corresponding to the volume data values at coordinates (X, Y, Z) in three-dimensional space.

Figure 2:
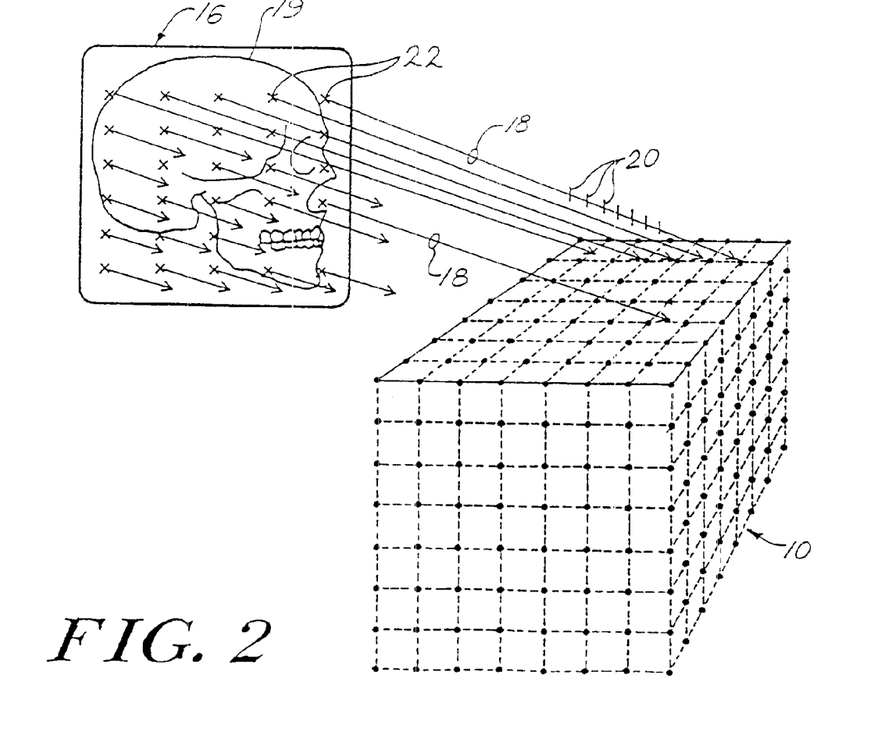
FIG. 2 is a diagrammatic illustration of a view of a volume data set being projected onto an image plane by means of ray-casting.

FIG. 2 illustrates an example of a volume data set 10 comprising an array of slices from a tomographic scan of the human head. A two-dimensional image plane 16 represents the surface on which a volume rendered projection of the human head is to be displayed. In a technique known as ray-casting, rays 18 are cast from pixel positions 22 on the image plane 16 through the volume data set 10, with each ray accumulating color and opacity from the data at voxel positions as it passes through the volume. In this manner the color, transparency, and intensity as well as other parameters of a pixel are extracted from the volume data set as the accumulation of data at sample points 20 along the ray. In this example, voxel values associated with bony tissue are assigned an opaque color, and voxel values associated with all other tissue in the head are assigned a transparent color. Therefore, the result of accumulation of data along a ray and the attribution of this data to the corresponding pixel result in an image 19 in viewing plane 16 that appears to an observer to be an image of a three-dimensional skull, even though the actual skull is hidden from view by the skin and other tissue of the head.

Figure 3:
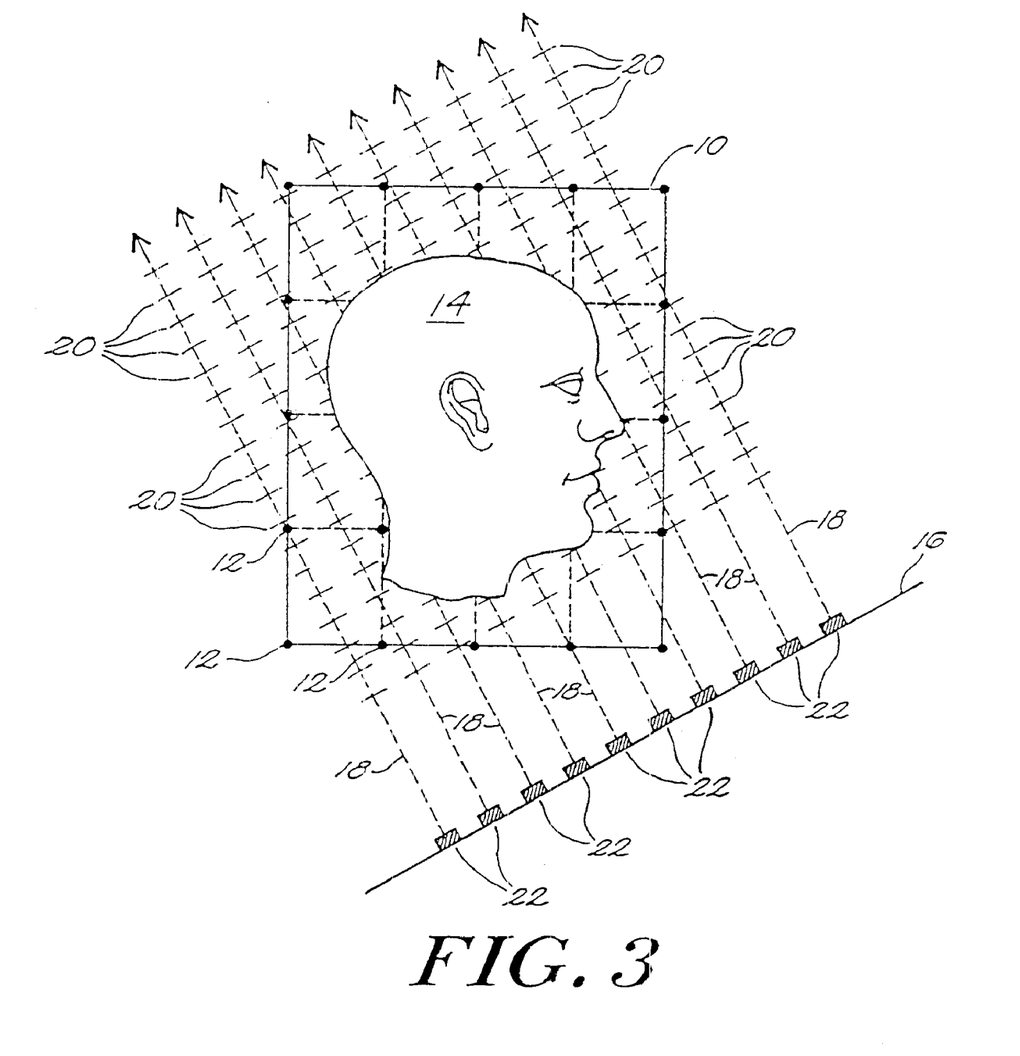
FIG. 3 is a cross-sectional view of the volume data set of FIG. 2.

In order to appreciate more fully the method of ray-casting, FIG. 3 depicts a two-dimensional cross-section of a three-dimensional volume data set 10 of FIG. 2. The first and second dimensions correspond to the dimensions illustrated on the plane of the page. The third dimension of volume data set 10 is perpendicular to the printed page so that only a cross section of the data set can be seen in the figure. Voxel positions are illustrated by dots 12 in the figure. The voxels associated with each position are data values that represent some characteristic or characteristics of a three-dimensional object 14 at fixed points of a rectangular grid in three-dimensional space. Also illustrated in FIG. 3 is a one-dimensional view of a two-dimensional image plane 16 onto which an image of object 14 is to be projected in terms of providing pixels 22 with the appropriate characteristics. In this illustration, the second dimension of image plane 16 is also perpendicular to the printed page.

In the technique of ray-casting, rays 18 are extended from pixels 22 of the image plane 16 through the volume data set 10. Each ray accumulates color, brightness, and transparency or opacity at sample points 20 along that ray. This accumulation of light determines the brightness and color of the corresponding pixels 22. Thus while the ray is depicted going outwardly from a pixel through the volume, the accumulated data can be thought of as being transmitted back down the ray where it is provided to the corresponding pixel to give the pixel color, intensity and opacity or transparency, amongst other parameters.

It will be appreciated that although FIG. 3 suggests that the third dimension of volume data set 10 and the second dimension of image plane 16 are both perpendicular to the printed page and therefore parallel to each other, in general this is not the case. The image plane may have any orientation with respect to the volume data set, so that rays 18 may pass through the volume data set 10 at any angle in all three dimensions.

It will also be appreciated that sample points 20 do not necessarily intersect the voxel 12 coordinates exactly. Therefore, the value of each sample point must be synthesized from the values of voxels nearby. That is, the intensity of light, color, and transparency or opacity at each sample point 20 must be calculated or interpolated as a mathematical function of the values of nearby voxels 12. The re-sampling of voxel data values to values at sample points is an application of the branch of mathematics known as sampling theory. The sample points 20 of each ray 18 are then accumulated by another mathematical function to produce the brightness and color of the pixel 22 corresponding to that ray. The resulting set of pixels 22 forms a visual image of the object 14 in the image plane 16.

Figure 4:
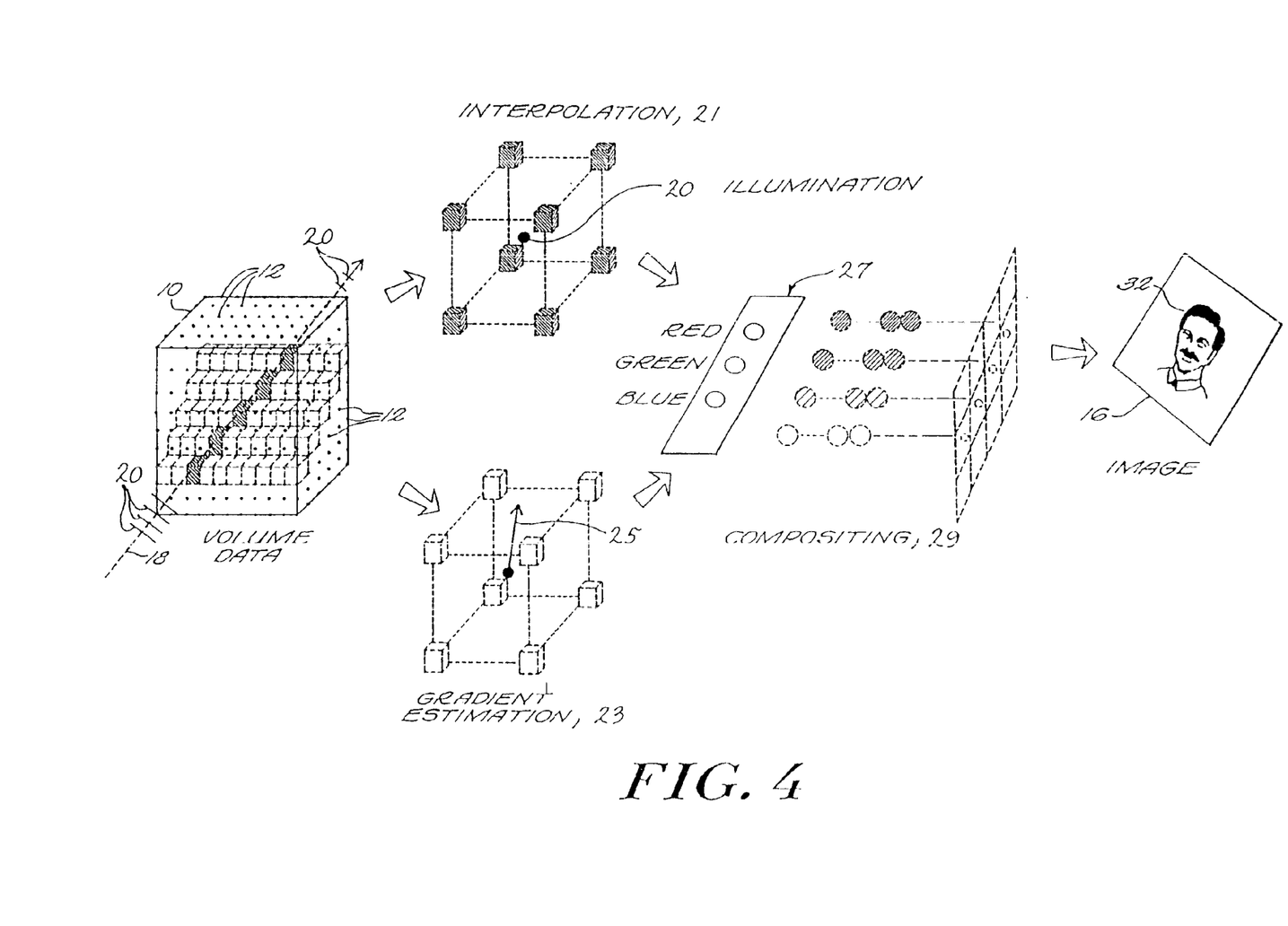
FIG. 4 is a diagrammatic illustration of the processing of an individual ray by ray-casting.

FIG. 4 illustrates the processing of an individual ray. Ray 18 passes through the three-dimensional volume data set 10 at some angle, passing near or possibly through voxel positions 12, and accumulates data at sample points 20 along each ray. The value at each sample point is synthesized as illustrated at 21 by an interpolation unit 103 (see FIG. 5), and its gradient is calculated as illustrated at 23 by a gradient estimation unit 111 (see FIG. 5). The sample point values from sample point 20 and the gradient 25 for each sample point are then processed in the pipeline to assign color, brightness or intensity, and transparency or opacity to each sample. As illustrated at 27, this is done via pipeline processing in which red, green and blue hues as well as intensity and opacity or transparency are calculated. Finally, the colors, levels of brightness, and transparencies assigned to all of the samples along all of the rays are applied as illustrated at 29 to a compositing unit 124 that mathematically combines the sample values into pixels depicting the resulting image 32 for display on image plane 16.

The calculation of the color, brightness or intensity, and transparency of sample points 20 is done in two parts. In one part, a mathematical function such as trilinear interpolation is utilized to take the weighted average of the values of the eight voxels in a cubic arrangement immediately surrounding the sample point 20. The resulting average is then used to assign a color and opacity or transparency to the sample point by some transfer function. In the other part, the mathematical gradient of the sample values at each sample point 20 is estimated by a method such as taking the differences between nearby sample points. It will be appreciated that these two calculations can be implemented in either order or in parallel with each other to produce mathematically equivalent results. The gradient is then used in a lighting calculation to determine the brightness of the sample point. Examples of well-known lighting can be found in the aforementioned textbook by Foley, vanDam, Feiner and Hughes entitled "Computer Graphics: Principles and Practice".

Figure 5:
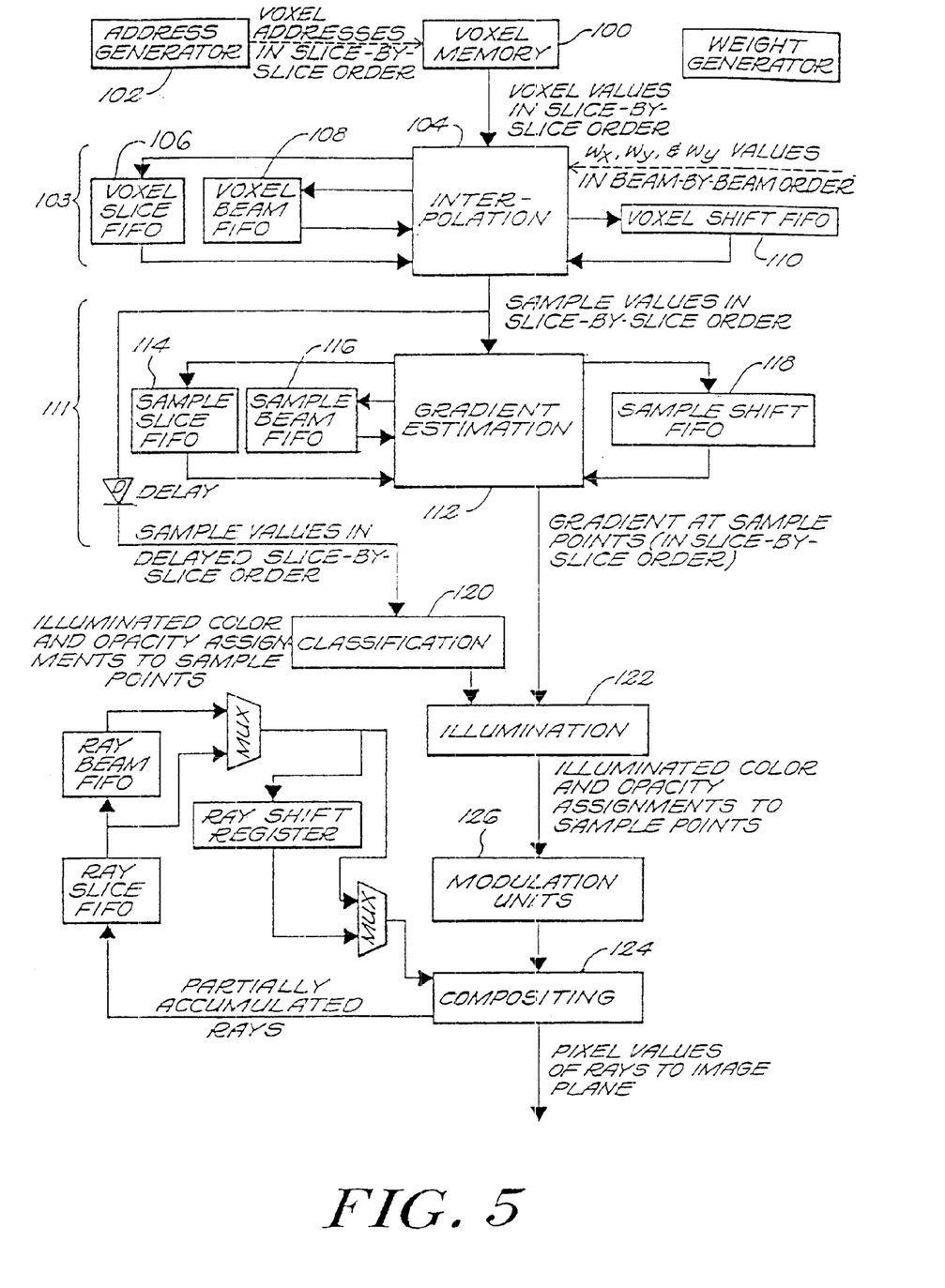
FIG. 5 is a block diagram of a pipelined processing element for real-time volume rendering in accordance with the present invention.

FIG. 5 depicts a block diagram of a pipelined processor appropriate for performing the calculations illustrated in FIG. 4. The pipelined processor comprises a plurality of pipeline stages, each stage of which holds one data element, so that a plurality of data elements are being processed at one time. Each data element is at a different degree of progress in its processing, and all data elements move from stage to stage of the pipeline in lock step. At the first stage of the pipeline, a series of voxel data values flow into the pipeline at a rate of one voxel per cycle from the voxel memory 100, which operates under the control of an address generator 102. The interpolation unit 103 receives voxel values located at coordinates X, Y and Z in three-dimensional space, where X, Y and Z are each integers. The interpolation unit 103 is a set of pipelined stages that synthesize data values at sample points between voxels corresponding to positions along rays that are cast through the volume. During each cycle, one voxel enters the interpolation unit and one interpolated sample value emerges. The latency between the time a voxel value enters the pipeline and the time that an interpolated sample value emerges depends upon the number of pipeline stages and the internal delay in each stage.

The interpolation unit of the pipeline include a set of interpolator stages 104 and three FIFO elements 106, 108, 110 for recirculating data through the stages. In the current embodiment, these are all linear interpolations, but other interpolation functions such as cubic and LaGrangian may also be employed. In the illustrated embodiment, interpolation is performed in each dimension as a separate stage, and the respective FIFO elements are included to recirculate data for purposes of interpolating between voxels that are adjacent in space but widely separated in the time of entry to the pipeline. The delay of each FIFO is selected to be exactly the amount of time elapsed between the reading of one voxel and the reading of an adjacent voxel in that particular dimension so that the two can be combined in an interpolation function. It will be appreciated that voxels can be streamed through the interpolation stage at a rate of one voxel per cycle with each voxel being combined with the nearest neighbor that had been previously recirculated through the FIFO associated with that dimension.

Three successive interpolation stages, one for each dimension, are concatenated and voxels can pass through the three stages at a rate of one voxel per cycle at both input and output. The throughput of the interpolation stages is one voxel per cycle independent of the number of stages within the interpolation unit and independent of the latency of the data within the interpolation unit and the latency of the recirculation stages within that unit. Thus, the interpolation unit converts voxel values located at integer positions in XYZ space into sample values located at non-integer positions at the rate of one voxel per cycle. In particular, the interpolation unit converts values at voxel positions to values at sample positions disposed along the rays.

Following the interpolation unit 103 is a gradient estimation unit 111, which also includes a plurality of pipelined stages and recirculation FIFOs. The function of the gradient unit 111 is to derive the rate of change of the sample values in each of the three dimensions. The gradient estimation unit operates in a similar manner to the interpolation unit and computes the rate of change of the sample values in each of the three dimensions. Note, the gradient is used to determine a normal vector for illumination, and its magnitude may be used as a measure of the existence of a surface when the gradient magnitude is high. In the present embodiment the calculation is obtained by taking central differences, but other functions known in the art may be employed. Because the gradient estimation unit is pipelined, it receives one interpolated sample per cycle, and it outputs one gradient per cycle. As with the interpolation unit, each gradient is delayed from its corresponding sample by a number of cycles which is equal to the amount of latency in the gradient estimation stage 112 including respective recirculation FIFOs 114, 116, 118. The delay for each of the recirculation FIFOs is determined by the length of time needed between the reading of one interpolated sample and nearby interpolated samples necessary for deriving the gradient in that dimension.

The interpolated sample and its corresponding gradient are concurrently applied to the classification and illumination units 120 and 122 respectively at a rate of one interpolated sample and one gradient per cycle. Classification unit 120 serves to convert interpolated sample values into colors in the graphics system; i.e., red, green, blue and alpha values, also known as RGBA values. The red, green, and blue values are typically fractions between zero and one inclusive and represent the intensity of the color component assigned to the respective interpolated sample value. The alpha value is also typically a fraction between zero and one inclusive and represents the opacity assigned to the respective interpolated sample value.

The gradient is applied to the illumination unit 122 to modulate the newly assigned RGBA values by adding highlights and shadows to provide a more realistic image. Methods and functions for performing illumination are well known in the art. The illumination and classification units accept one interpolated sample value and one gradient per cycle and output one illuminated color and opacity value per cycle.

Although in the current embodiment, the interpolation unit 103 precedes the gradient estimation unit 111, which in turn precedes the classification unit 120, it will be appreciated that in other embodiments these three units may be arranged in a different order. In particular, for some applications of volume rendering it is preferable that the classification unit precede the interpolation unit. In this case, data values at voxel positions are converted to RGBA values at the same positions, then these RGBA values are interpolated to obtain RGBA values at sample points along rays.

The compositing unit 124 combines the illuminated color and opacity values of all sample points along a ray to form a final pixel value corresponding to that ray for display on the computer terminal or two-dimensional image surface. RGBA values enter the compositing unit 124 at a rate of one RGBA value per cycle and are accumulated with the RGBA values at previous sample points along the same ray. When the accumulation is complete, the final accumulated value is output as a pixel to the display or stored as image data. The compositing unit 124 receives one RGBA sample per cycle and accumulates these ray by ray according to a compositing function until the ends of rays are reached, at which point the one pixel per ray is output to form the final image. A number of different functions well known in the art can be employed in the compositing unit, depending upon the application.

Between the illumination unit 122 and the compositing unit 124, various modulation units 126 may be provided to permit modification of the illuminated RGBA values, thereby modifying the image that is ultimately viewed. One such modulation unit is used for cropping the sample values to permit viewing of a restricted subset of the data. Another modulation unit provides a function to show a slice of the volume data at an arbitrary angle and thickness. A third modulation unit provides a three-dimensional cursor to allow the user or operator to identify positions in XYZ space within the data. Each of the above identified functions is implemented as a plurality of pipelined stages accepting one RGBA value as input per cycle and emitting as an output one modulated RGBA value per cycle. Other modulation functions may also be provided which may likewise be implemented within the pipelined architecture herein described. The addition of the pipelined modulation functions does not diminish the throughput (rate) of the processing pipeline in any way but rather affects the latency of the data as it passes through the pipeline.

In order to achieve a real-time volume rendering rate of, for example, 30 frames per second for a volume data set with 256×256×256 voxels, voxel data must enter the pipelines at $256^3 \times 30$ frames per second or approximately 500 million voxels per second. It will be appreciated that although the calculations associated with any particular voxel involve many stages and therefore have a specified latency, calculations associated with a plurality of different voxels can be in progress at once, each one being at a different degree of progression and occupying a different stage of the pipeline. This makes it possible to sustain a high processing rate despite the complexity of the calculations.

It will be further appreciated that the above described pipelined processor can be replicated as a plurality of parallel pipelines to achieve higher throughput rates by processing adjacent voxels in parallel. The cycle time of each pipeline is determined by the number of voxels in a typical volume data set, multiplied by the desired frame rate, and divided by the number of pipelines. In a preferred embodiment, the cycle time is 7.5 nanoseconds and four pipelines are employed in parallel.

Figure 6:
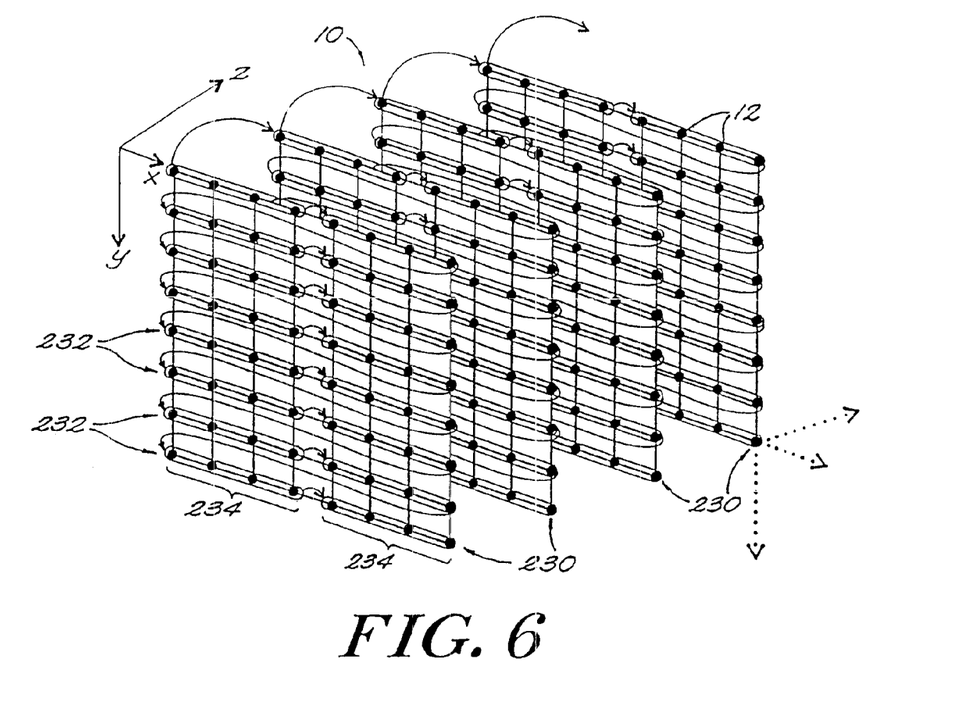
FIG. 6 is a schematic representation of an organization of voxels useful for volume rendering according to the present invention.

FIG. 6 illustrates an organization of the voxels 12 that is used during the rendering of a volume dataset 10 according to the illustrated embodiment. The Z axis of the organization of FIG. 6 is pre-selected to be the axis of the volume data set that is more nearly parallel to the view direction than either of the other two axes. Moreover, the direction of increasing coordinates along the Z axis is pre-selected to be the direction of rays 18 passing from the image plane 16 toward the volume data set 10. The X and Y axes of this organization are pre-selected following the selection of the Z axis, so that rays from the image plane 16 proceeding parallel to the view direction always point in the direction of non-decreasing coordinates along both the X and Y axes. It will be appreciated that as the view direction changes from frame to frame in a real-time volume rendering system, the selection of the X, Y and Z axes and their directions must change accordingly.

As shown in FIG. 6, for a given selection of the X, Y and Z axes, the data set 10 is divided into parallel "slices" 230 in the Z direction. Each slice 30 is divided into "beams" 232 in the Y direction, and each beam 232 consists of a row of voxels 12 in the X direction. The voxels 12 within a beam 232 are divided into groups 234 of voxels 12 which as described above are processed in parallel by the four rendering pipelines 212. The groups 234 are then processed in left-to-right order within a beam 232; beams 232 are processed in top-to-bottom order within a slice 230; and slices 230 are processed in order front-to-back. This order of processing corresponds to a three-dimensional scan of the data set 10 in the X, Y, and Z directions.

Figure 7:
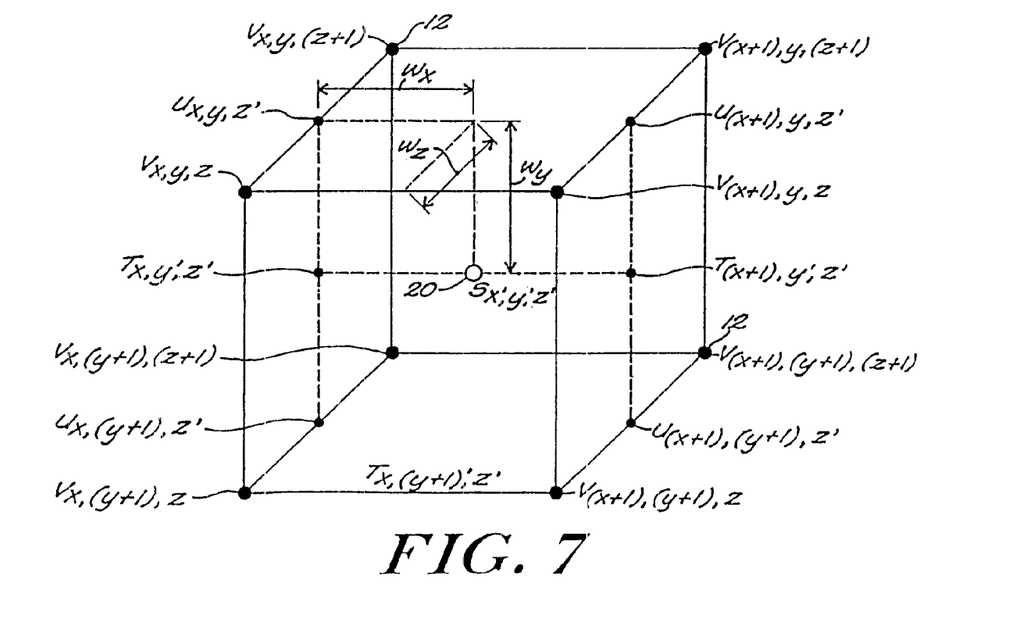
FIG. 7 is a diagram showing the relationship between voxels and samples in the processing element of FIG. 5.

FIG. 7 illustrates how samples 20 of the voxel data are calculated. A sample 20 is indicated as $S_{x',y',z'}$, where x', y' and z' indicate position along the respective axes. The position of a sample $S_{x',y',z'}$ with respect to a corresponding voxel $V_{x,y,z}$ is expressed in terms of three fractional weights $w_x$, $w_y$, and $w_z$. Each weight represents the position of a sample as a fraction of the distance between neighboring voxels along the corresponding axis. The sample value is calculated by a well-known process called tri-linear interpolation. One way of performing tri-linear interpolation is via the following three steps:

1. Four intermediate samples $U_{x,y,z'}$, $U_{(x+1),y,z'}$, $U_{x,(y+1),z'}$ and $U_{(x+1),(y+1),z'}$ are calculated as follows:

$$U_{x,y,z'} = V_{x,y,z} + W_z(V_{x,y,(z+1)} - V_{x,y,z})$$

$$U_{(x+1),y,z'} = V_{(x+1),y,z} + W_z(V_{(x+1),y,(z+1)} - V_{(x+1),y,z})$$

$$U_{x,(y+1),z'} = V_{x,(y+1),z} + W_z(V_{x,(y+1),(z+1)} - V_{x,(y+1),z})$$

$$U_{(x+1),(y+1),z'} = V_{(x+1),(y+1),z} + W_z(V_{(x+1),(y+1),(z+1)} - V_{(x+1),(y+1),z})$$

2. Two intermediate samples $T_{x,y',z'}$ and $T_{(x+1),y',z'}$ are calculated as follows:

$$T_{x,y',z'} = U_{x,y,z'} + W_y(U_{x,(y+1),z'} - U_{x,y,z'})$$

$$T_{(x+1),y',z'} = U_{(x+1),y,z'} + W_y(U_{(x+1),(y+1),z'} - U_{(x+1),y,z'})$$

3. Finally the sample $S_{x',y',z'}$ is calculated as:

$$S_{x',y',z'} = T_{x,y',z'} + W_x(T_{(x+1),y',z'} - T_{x,y',z'})$$

It will be noted that the samples $S_{x',y',z'}$ are organized in planes parallel to one face of the volume data set 10, and also that the samples are organized in rectangular arrays whose sides are parallel to the axes of the volume data set 10. Accordingly, it will be appreciated that during the calculation of samples within neighboring groups of 8 voxels, some of the intermediate values U and T described above can be re-used. For example, the intermediate values $T_{x,y',z'}$ and $T_{(x+1),y',z'}$ can be used to calculate sample values $S_{(x'-1),y',z'}$ and $S_{(x'+1),y',z'}$ respectively. These intermediate results are thus passed among calculation elements using FIFO elements in order to maximize processing bandwidth.

The term "supersampling" refers to the calculation at sample points with a spacing less than the spacing between voxels in a given dimension. Equivalently, it refers to the re-sampling of volume data at spatial frequencies greater than the spatial frequency of the voxels themselves. Supersampling may be desirable to reduce visual artifacts that could be created by re-sampling at a lower spatial frequency. For example, it will be appreciated that when the view direction is not exactly parallel to the Z axis, the distance between voxel slices as measured along the lengths of the rays is greater than that prescribed by the Nyquist frequency and therefore visual artifacts are likely to appear. Supersampling in either the X or Y dimension can be accomplished by setting the spacing between the rays 18 to less than the spacing between voxels 12 in the X–Y plane. Supersampling in the Z dimension can be accomplished by creating "virtual slices" of sample points whose spacing in the Z dimension is specified to be less than the spacing between the slices 230 of voxels 12. The spacing between virtual slices may be an integer sub-multiple of the spacing of voxel slices 230, but in general the spacing can be specified as an arbitrary fraction of the spacing between voxel slices 230. The spacing between virtual slices should be small to obtain desired fidelity, but this goal must be balanced with the need for more buffering and greater calculation precision as the spacing decreases.

In the illustrated embodiment, the spacing of the rays 18 in the X and Y dimensions is always the same as the spacing of the voxels 12. Thus the illustrated processing element 210 does not perform supersampling in the X and Y dimensions. In the illustrated embodiment, the effect of X and Y supersampling can be achieved by performing multiple renderings of the dataset 10 each with slightly different X and Y offsets, and then interleaving the resulting renderings in software.

In the illustrated embodiment, the virtual slices are created by first obtaining a slice of Z-interpolated values U, as described above. From the U values, Y–Z interpolated values T are obtained, and then finally the X–Y–Z interpolated values (or samples) S are obtained from the T values. This is one form of tri-linear interpolation. As previously mentioned, other forms of interpolation such as LaGrangian can alternatively be used. The illustrated technique can be applied to supersampling in the X and Y dimensions also. Because of the order in which the interpolations are performed, the intermediate values U and T can advantageously be reused during the calculations for neighboring samples. Strictly speaking, one tri-linear interpolation requires 7 multiplies and 14 adds, but by this technique, each sample is obtained using only 3 multiplies and 6 adds.

Figure 8:
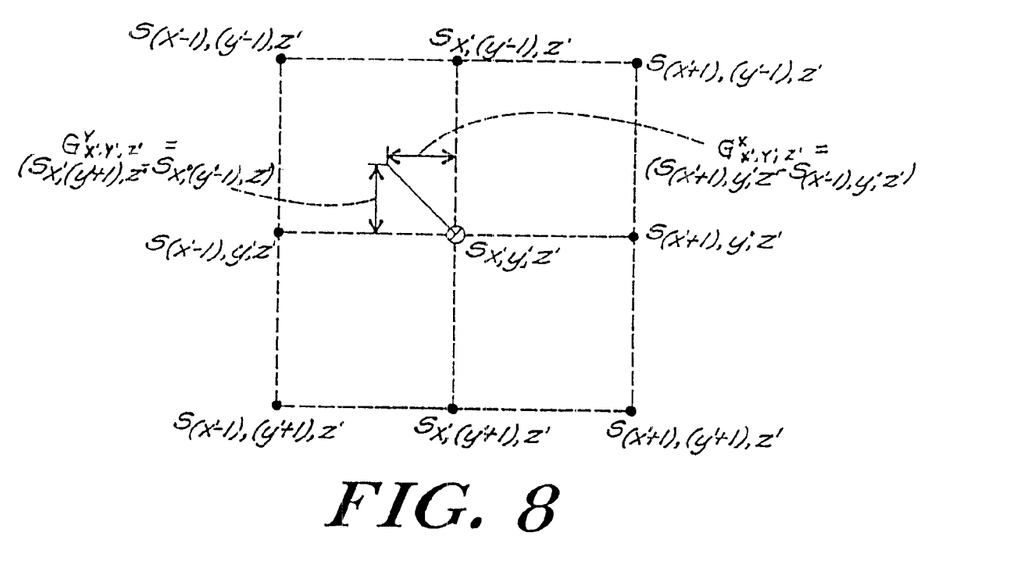
FIG. 8 is a diagram illustrating how gradients are calculated from sample points in the processing element of FIG. 5.

FIG. 8 shows that the X and Y components of the gradient of a sample, $G^x_{x',y',z'}$ and $G^y_{x',y',z'}$ are each estimated as a "central difference", i.e., the difference between two adjacent sample points in the corresponding dimension. Thus as shown $$G^x_{x',y',z'} = S_{(x'+1),y',z'} - S_{(x'-1),y',z'}$$

and $$G^y_{x',y',z'} = S_{x',(y'+1),z'} - S_{x',(y'-1),z'}$$

It will be appreciated that the calculation of the Z component of the gradient (also referred to herein as the "Z-gradient") $G^z_{x',y',z'}$ is not so straightforward, because in the Z direction samples are offset from each other by an arbitrary viewing angle. Another complicating factor, discussed below, is whether supersampling is used. It is possible, however, to greatly simplify the calculation of $G^z_{x',y',z'}$ when both the gradient calculation and the interpolation calculation are linear functions of the voxel data (as in the illustrated embodiment). When both functions are linear, it is possible to reverse the order in which the functions are performed without changing the result. The Z-gradient is calculated at each voxel position 12 in the same manner as described above for $G^x_{x',y',z'}$ and $G^y_{x',y',z'}$, and then $G^z_{x',y',z'}$ is obtained at the sample point x', y', z' by interpolating the voxel Z-gradients in the Z direction.

Figure 9:
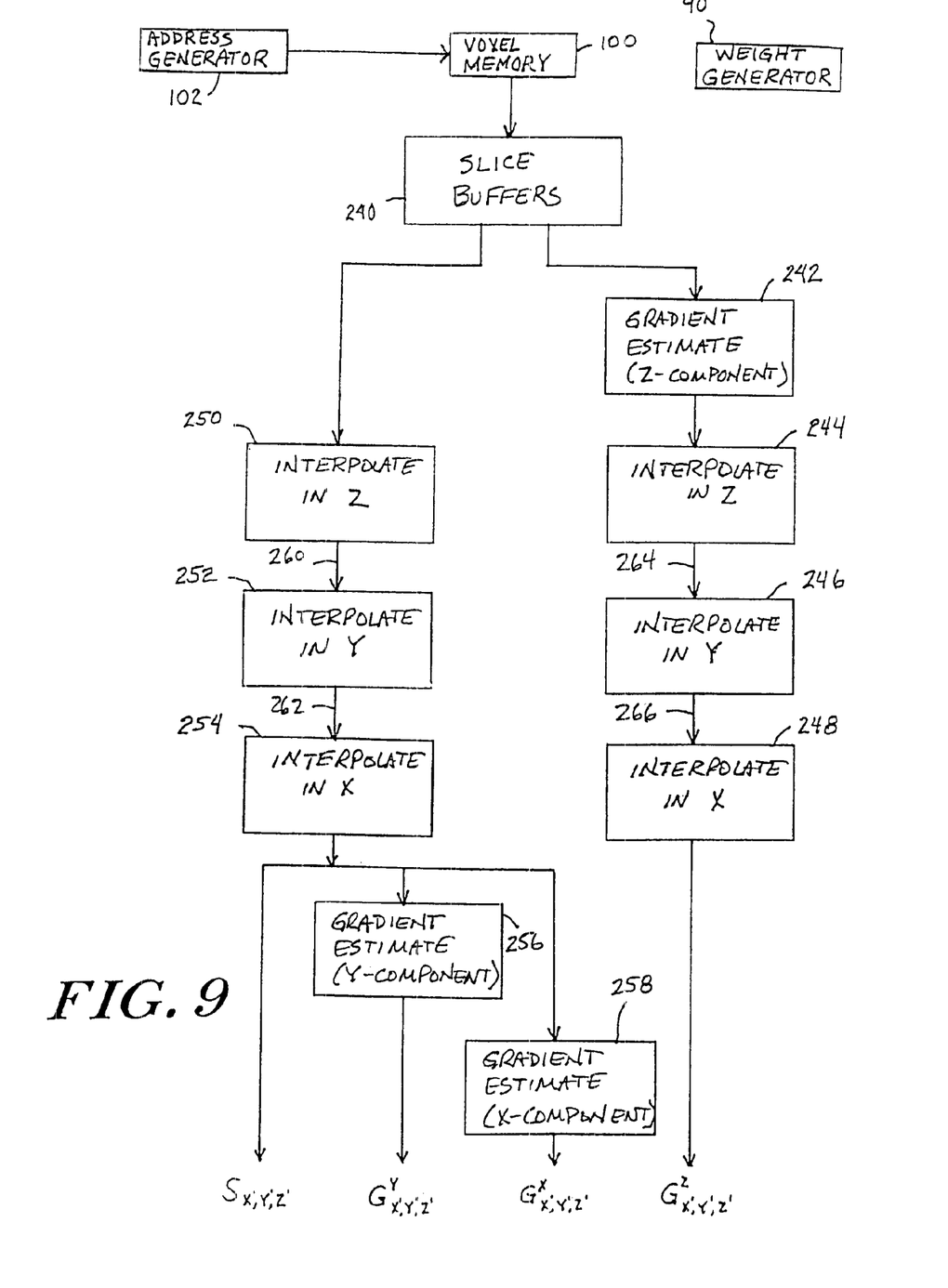
FIG. 9 is a block diagram of the portion of the processing element of FIG. 5 that calculates samples and gradients for use by subsequent processing stages.

FIG. 9 shows the portion of the processor of FIG. 5 that performs the gradient and interpolation calculations. A set of slice buffers 240 is used to buffer adjacent slices of voxels from the voxel memory 100, in order to time-align voxels adjacent in the Z direction for the gradient and interpolation calculations. The slice buffers 240 are also used to de-couple the timing of the voxel memory 100 from the timing of the remainder of the processing unit when Z-axis supersampling is employed, a function described in greater detail below. A first gradient estimation unit 242 calculates the Z-gradient for each voxel from the slice buffers 240. A first interpolation unit 244 interpolates the Z-gradient in the Z direction, resulting in four intermediate values analogous to the U values described above. These values are interpolated in the Y and X directions by interpolation units 246 and 248 to yield the interpolated Z-gradient $G^z_{x',y',z'}$. Storage elements not shown in FIG. 9 are used to temporarily store the intermediate values from units 244 and 246 for interpolating neighboring Z-gradients in a manner like that discussed above for samples.

The voxels from the slice buffers 240 are also supplied to cascaded interpolation units 250, 252 and 254 in order to calculate the sample values $S_{x',y',z'}$. These values are used by the classification unit 120 of FIG. 5, and are also supplied to additional gradient estimation units 256 and 258 in which the Y and X gradients $G^y_{x',y',z'}$ and $G^x_{x',y',z'}$ respectively are calculated.

As shown in FIG. 9, the calculation of the Z-gradients $G^z_{x',y',z'}$ and the samples $S_{x',y',z'}$ proceed in parallel, as opposed to the sequential order implied by FIG. 5. This structure has the benefit of significantly simplifying the Z-gradient calculation, as previously mentioned. As another benefit, calculating the gradient in this fashion can yield more accurate results, especially at higher spatial sampling frequencies. The calculation of central differences on more closely-spaced samples is more sensitive to the mathematical imprecision inherent in a real processor. However, the benefits of this approach are accompanied by a cost, namely the cost of three additional interpolation units 244, 246 and 248. In alternative embodiments, it may be desirable to forego the additional interpolation units and calculate all gradients from samples alone. Conversely, it may be desirable to perform either or both of the X-gradient and Y-gradient calculations in the same manner as shown for the Z-gradient. In this way the benefit of greater accuracy can be obtained in a system in which the cost of the additional interpolation units is not particularly burdensome.

Figure 10:
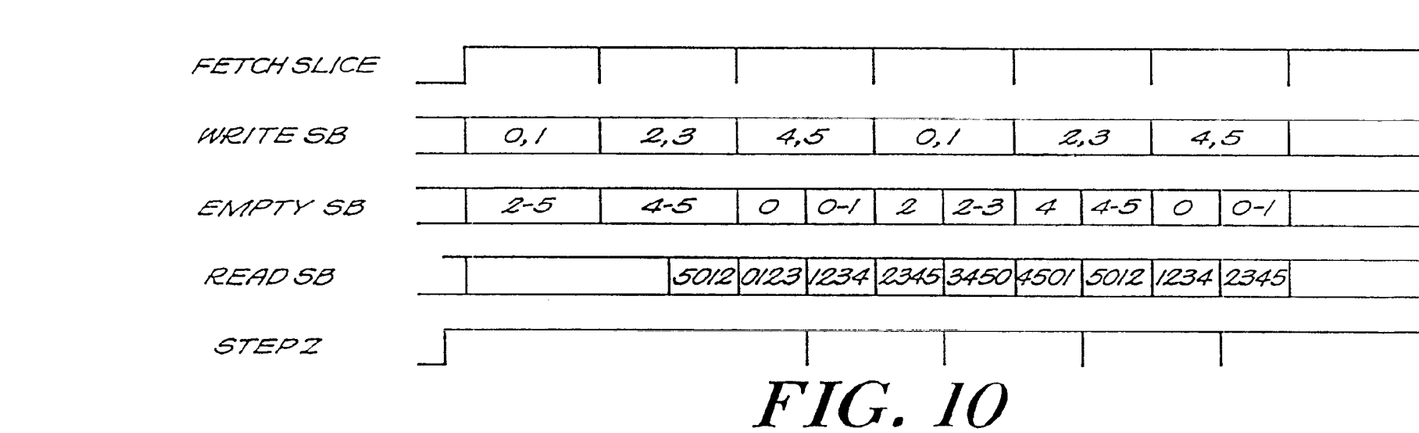
FIGS. 10 and 11 are timing diagrams illustrating the operation of slice buffers in the processing element of FIG. 9.

FIG. 10 illustrates the writing and reading of the slice buffers 240 when super-sampling is not used. In this case, only one sample and gradient are calculated per voxel per slice 230. FIG. 10 shows that two slice buffers are loaded simultaneously (i.e., (0, 1), (2, 3) etc.), and the pairs of slice buffers are loaded in a sequential, round-robin fashion. The line labelled EMPTY SB indicates which slice buffers are considered empty at a given time, meaning that they do not contain data that will be read out to the processing element imminently. The line labelled READ SB indicates which four slice buffers are being read at a given time. As shown, the slice buffer sets are read in a sequential, round-robin fashion.

Figure 11:
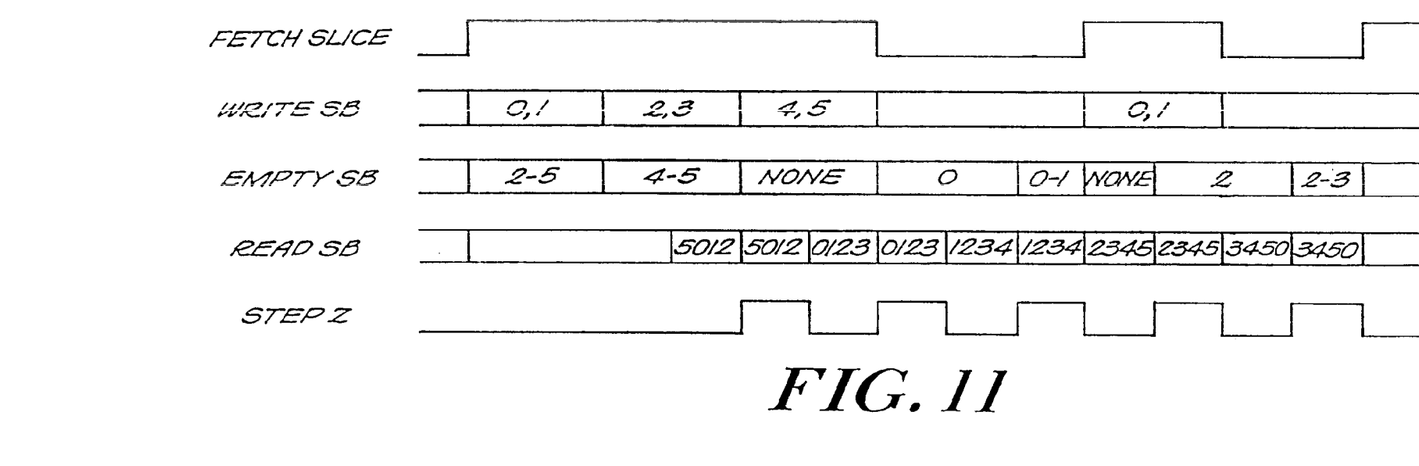

FIG. 11 illustrates the writing and reading of the slice buffers 250 when super-sampling at a spatial frequency of about twice the voxel spatial frequency is used. In this case, two samples and gradients are calculated per voxel per slice 230. Each set of four slice buffers is read out twice, once for each sample-gradient pair calculated by the processing element. Stepping in the Z direction is indicated by the toggling STEP Z signal. Initially, the six slice buffers 240 are filled for three successive slice fetches, and then subsequently emptied and re-filled at half the initial rate, as indicated by the signal fetchSlice. It will be appreciated that for different supersampling frequencies the write and read rates are changed accordingly. Because the flow rate of voxels from voxel memory 100 is diminished when super-sampling is used, the effective image rendering rate rendered is likewise reduced. Thus in the illustrated case of approximately 2× supersampling, the rendering rate is reduced to approximately 15 frames per second.

It will be appreciated that in alternative embodiments in which supersampling in either or both the X and Y directions is employed, buffering must be used at intermediate points 260, 262, 264 and 266 in the processing element of FIG. 9. Such buffering performs a function analogous to that performed by the slice buffers 240, namely decoupling the timing of successive stages in order to allow for multiple samples and gradients to be calculated per pair of adjacent beams or individual values. Beam buffers are required at points 260 and 264 to provide the necessary de-coupling for supersampling in Y, and sample buffers are required at points 262 and 266 to provide the necessary de-coupling for supersampling in X.

It should be noted that because supersampling reduces the distance between samples, it may decrease the accuracy of gradient calculations obtained by central differences. For this reason, it may be desirable to employ the described technique of calculating gradients on voxels and then interpolating the result in any dimension in which sufficiently high-frequency supersampling is used.

Figure 12:
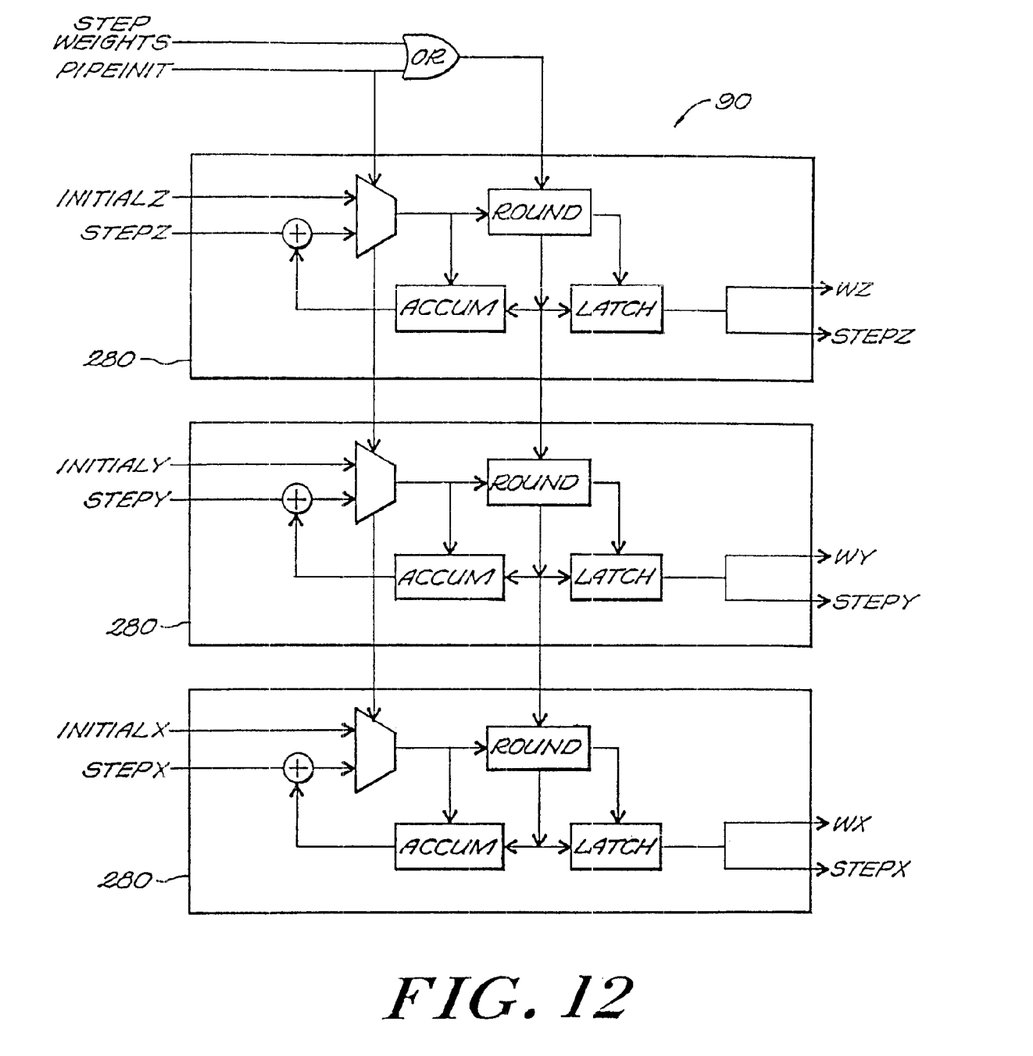
FIG. 12 is a block diagram of weight generator logic in the processing element of FIG. 9.

FIG. 12 shows the structure of the weight generator 90 of FIG. 9, which is used to provide the previously-described weights $w_z$, $w_y$, and $w_x$ used by the various calculation units. A differential data analyzer (DDA) algorithm is used to continually generate updated weights as the processor steps through the volume data. The weights $w_z$, $w_y$, and $w_x$ indicate the position of a sample $S_{x',y',z'}$ relative to a voxel $V_{x,y,z}$, where $x \leq x' \leq x+l$, $y \leq y' \leq y+l$, and $z \leq z' \leq z+l1$ and where $x'=x+w_x$, $y'=y+w_y$, and $z'=z+w_z2$ Note that while voxels 12 have integer coordinates in XYZ space, sample points 20 in general have non-integer coordinates. The weight generator 90 is programmed with step sizes stepX for the X dimension, stepY for the Y dimension and stepZ for the Z dimension. These step sizes are derived by controlling software from the orientation of the view axis, and hence of the rays 18, with respect to the X, Y and Z coordinate axes.

Three identical weight calculation units 280 are used, one per X, Y and Z dimension. Each unit 280 receives an initial value (e.g. initialZ) and a step size (e.g. StepZ). Each unit 280 includes a weight accumulator. The step sizes are repeatedly accumulated by the accumulators within the calculation units 280 as samples are calculated. During each step, a new weight is calculated and rounded to 8 bits of precision; it will be appreciated that additional bits of precision are carried to prevent accumulation errors from exceeding an acceptable level. The rounded weight outputs $w_x$, $w_y$, and $w_z$ are supplied to the interpolation units shown in FIG. 9.

The accumulator for the X dimension counts up to its maximum value as voxels 12 within a beam 232 are processed, and the accumulator for the Y dimension counts up as beams 232 within a slice 230 are processed. The accumulator for the Z dimension counts up as virtual slices within the data set 10 are processed. The precision of these step sizes is 19 bits to the right of the binary point.

The step outputs stepX, stepY, and stepZ from the weight generator 90 are used to count samples for control purposes, such as controlling the slice buffers 250 as described above. It will be appreciated that in the illustrated embodiment the signals stepX and stepY are incremented by one during each sampling step in the corresponding dimension, whereas the signal stepZ increments only when a sampling step crosses the boundary of the next slice 230. This occurs every z-step if supersampling is not enabled, but when supersampling is used then it occurs at a rate inversely proportional to the supersampling factor.

A ray-casting volume rendering system employing supersampling of the volume dataset has been described. It will be apparent to those skilled in the art that modification to and variation of the above-described methods and apparatus are possible without departing from the inventive concepts disclosed herein. Accordingly, the invention should be viewed as limited solely by the scope and spirit of the appended claims.

What is claimed is:

1. In a hardware rendering pipeline, a method for rendering a volume data set of voxels constituting a three-dimensional representation of an object onto an image plane having pixel positions, comprising:

supersampling the voxels to generate supersampled samples at supersampled points of a supersampled data set, the supersampled points having a spacing less than a spacing of the voxels;

casting rays through the supersampled data set from the pixel positions in the image plane; and resampling the supersampled data set points along each ray to generate color values for each corresponding pixel.

2. The method of claim 1, further comprising:

dividing the volume data set into a plurality of slices parallel to the image plane;

dividing each slice into a plurality of beams;

dividing each beam into groups of voxels;

processing the groups of voxels in a left-to-right order within each beam;

processing the beams in a top-to-bottom order within each slice; and processing the slices in a front-to-back order.

3. The method of claim 1 wherein the supersampling is in a direction parallel to the image plane, further comprising:

setting a spacing between the rays to be less than the spacing between the voxels in a plane parallel to the image plane.

4. The method of claim 2 wherein the supersampling is in a direction perpendicular to the image plane, further comprising:

generating virtual slices of the supersampled points, wherein a spacing between the virtual slices is less than a spacing between the slices of voxels.

5. The method of claim 2 wherein the supersampling is in a direction parallel to the image plane and a direction perpendicular to the image plane, further comprising:

setting a spacing between the rays to be less than the spacing between the voxels in a plane parallel to the image plane; and generating virtual slices of the sampling points, the virtual slices having a spacing less than a spacing between the slices of voxels.

6. The method of claim 4, wherein the spacing between the virtual slices is an integer sub-multiple of the spacing between the slices of voxels.

7. The method of claim 1, further comprising:

tri-linear interpolating to obtain the supersampled points.

8. The method of claim 4, further comprising:

storing adjacent slices of voxels in a set of slice buffers in order to time-align voxels adjacent in the direction perpendicular to the image plane for the resampling.

9. The method of claim 1, further comprising:

interpolating a gradient in a direction perpendicular to the image plane in a first interpolation unit for each supersampled point;

interpolating gradients in a direction parallel to the image plane in a second and third interpolation unit for each supersampled point, respectively; and combining the gradient in the direction perpendicular to the image plane with the gradients in the direction parallel to the image plane for each supersampled point.

10. The method of claim 9, wherein the gradients are determined in parallel with the resampling of the supersampled points.

11. The method of claim 9, further comprising:

reading adjacent slices from memory into the set of slice buffers prior to interpolating the gradients.

12. The method of claim 1, wherein the resampling for each supersampled point utilizes a weighted average of eight voxels in a cubic arrangement immediately surrounding each supersampled point.

13. The method of claim 12, further comprising:

generating a position of each supersampled point relative to positions of each of the eight voxels.

14. A method of determining a pixel value comprising:

casting rays through a data set representing voxels;

accumulating data at sample points along one of the rays;

synthesizing a value for one of the sample points from the accumulated data;

determining a gradient for the sample point;

identifying at least one of color, brightness, intensity, transparency, and opacity of the sample point based on the synthesized value and the gradient; and determining a pixel value based on the identified at least one of color, brightness, intensity, transparency, and opacity of the sample point where one of (i) the sample points are spaced at less than a spacing between voxels and (ii) the cast rays are spaced at less than a spacing between the voxels.

15. A method of determining a pixel value according to claim 14, further comprising:

re-sampling the data in the data set at a spatial frequency greater than a spatial frequency of voxels to accumulate the data at the sample points along the one ray.

16. The method of determining a pixel value according to claim 14, further comprising:

creating a virtual slice of sample points with spacing less than spacing between slices of voxels.

17. A method of determining a pixel value according to claim 14, wherein the sample points are spaced at less than a spacing between voxels in a given dimension.

* * * * *